US012331268B2

(12) United States Patent
Lundberg et al.

(10) Patent No.: US 12,331,268 B2
(45) Date of Patent: Jun. 17, 2025

(54) NONIONIC SURFACTANT-BASED LIQUID DETERGENT COMPOSITIONS CONTAINING A MANGANESE BLEACH CATALYST

(71) Applicant: ECOLAB USA INC., Saint Paul, MN (US)

(72) Inventors: Steven Lundberg, Saint Paul, MN (US); Jonathan P. Fast, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 483 days.

(21) Appl. No.: 17/457,849

(22) Filed: Dec. 6, 2021

(65) Prior Publication Data

US 2022/0089980 A1 Mar. 24, 2022

Related U.S. Application Data

(63) Continuation of application No. 16/353,424, filed on Mar. 14, 2019, now Pat. No. 11,225,631.

(60) Provisional application No. 62/644,823, filed on Mar. 19, 2018.

(51) Int. Cl.

| | |
|---|---|
| ***C11D 1/72*** | (2006.01) |
| ***C11D 3/20*** | (2006.01) |
| ***C11D 3/39*** | (2006.01) |
| ***C11D 3/395*** | (2006.01) |
| ***C11D 3/43*** | (2006.01) |

(52) U.S. Cl.

CPC .............. *C11D 3/3951* (2013.01); *C11D 1/72* (2013.01); *C11D 3/2079* (2013.01); *C11D 3/391* (2013.01); *C11D 3/3915* (2013.01); *C11D 3/3917* (2013.01); *C11D 3/3925* (2013.01); *C11D 3/3932* (2013.01); *C11D 3/43* (2013.01); *C11D 2111/12* (2024.01); *C11D 2111/14* (2024.01)

(58) Field of Classification Search

CPC .. C11D 1/72; C11D 1/825; C11D 1/83; C11D 3/0047; C11D 3/3905; C11D 3/395; C11D 3/3951; C11D 3/3953; C11D 2111/12

See application file for complete search history.

(56) References Cited

U.S. PATENT DOCUMENTS

| | | | | |
|---|---|---|---|---|
| 4,430,243 | A | 2/1984 | Bragg | |
| 4,478,733 | A | 10/1984 | Oakes | |
| 4,623,357 | A | 11/1986 | Urban | |
| 4,728,455 | A | 3/1988 | Rerek | |
| 5,194,416 | A | 3/1993 | Jureller et al. | |
| 5,227,084 | A | 7/1993 | Martens et al. | |
| 5,246,612 | A | 9/1993 | Van Dijk et al. | |
| 5,356,554 | A | 10/1994 | Delwel et al. | |
| 5,409,627 | A | 4/1995 | Boskamp et al. | |
| 5,429,769 | A | 7/1995 | Nicholson et al. | |
| 5,480,575 | A | 1/1996 | Altieri et al. | |
| 5,536,441 | A | 7/1996 | Chapple et al. | |
| 5,703,034 | A | 12/1997 | Offshack et al. | |
| 6,365,564 | B1 * | 4/2002 | Kott | C11D 17/0021 510/501 |
| 6,689,732 | B1 * | 2/2004 | Guedira | C11D 3/3945 510/424 |
| 7,070,820 | B2 | 7/2006 | Simonsen et al. | |
| 8,486,881 | B2 | 7/2013 | Borchers et al. | |
| 9,624,119 | B2 | 4/2017 | Dotzauer et al. | |
| 10,196,592 | B2 | 2/2019 | Pham et al. | |
| 2004/0266641 | A1 | 12/2004 | Gentschev et al. | |
| 2008/0194449 | A1 * | 8/2008 | Becker | C11D 3/3788 510/276 |
| 2009/0239778 | A1 | 9/2009 | Gentschev et al. | |
| 2010/0041583 | A1 * | 2/2010 | Ponder | C11D 3/3707 510/513 |
| 2012/0053109 | A1 | 3/2012 | Adamy et al. | |
| 2012/0070554 | A1 | 3/2012 | Dournel | |
| 2012/0208739 | A1 * | 8/2012 | Dykstra | C11D 3/3932 510/405 |
| 2012/0289449 | A1 | 11/2012 | Adamy | |
| 2013/0047345 | A1 * | 2/2013 | Fast | C11D 3/39 8/137 |
| 2013/0061883 | A1 | 3/2013 | Miravet Celades et al. | |
| 2014/0287477 | A1 * | 9/2014 | Cascao-Pereira | C12N 9/2417 435/197 |

(Continued)

FOREIGN PATENT DOCUMENTS

| | | | |
|---|---|---|---|
| CA | 2066871 | C | 10/1996 |
| CA | 2822012 | A1 | 6/2012 |

(Continued)

OTHER PUBLICATIONS

Ecolab USA Inc., PCT/US2015/035350 filed Jun. 11, 2015, "The International Search Report and the Written Opinion of the International Searching Authority, or the Declaration", 13 pages, mailed Sep. 11, 2015.

(Continued)

*Primary Examiner* — Charles I Boyer

(74) *Attorney, Agent, or Firm* — McKee, Voorhees & Sease PLC

(57) ABSTRACT

Bleach catalyst detergent compositions are provided. The compositions are suitable for use with additional detergent and/or bleaching compositions while providing bleach catalysts within a detergent composition. The detergent compositions are free of anionic surfactant, are highly aqueous and have a pH of less than 6. Methods of use for cleaning are disclosed.

24 Claims, No Drawings

(56) References Cited

U.S. PATENT DOCUMENTS

| | | | | |
|---|---|---|---|---|
| 2014/0349907 | A1* | 11/2014 | Frankenbach | C11D 1/83 510/321 |
| 2015/0361383 | A1 | 12/2015 | Dotzauer et al. | |
| 2015/0361385 | A1 | 12/2015 | Pham et al. | |
| 2016/0090533 | A1 | 3/2016 | Hirschmann et al. | |
| 2018/0201880 | A1 | 7/2018 | Rivera Cruz et al. | |
| 2019/0194576 | A1 | 6/2019 | Letzelter et al. | |
| 2019/0225918 | A1 | 7/2019 | Lant et al. | |
| 2019/0292494 | A1* | 9/2019 | Jenewein | C11D 3/166 |
| 2019/0345421 | A1 | 11/2019 | Vockenroth et al. | |

FOREIGN PATENT DOCUMENTS

| | | | |
|---|---|---|---|
| EP | 0141470 | A2 | 5/1985 |
| EP | 0458397 | B1 | 11/1991 |
| EP | 0458398 | B1 | 11/1991 |
| EP | 0509787 | A2 | 10/1992 |
| EP | 0510761 | A1 | 10/1992 |
| EP | 0510761 | B1 | 10/1992 |
| EP | 0544440 | A2 | 6/1993 |
| EP | 0544490 | A1 | 6/1993 |
| EP | 0544519 | B1 | 6/1993 |
| EP | 0549271 | A1 | 6/1993 |
| EP | 0549272 | A1 | 6/1993 |
| EP | 0693550 | A2 | 1/1996 |
| EP | 1360268 | B1 | 11/2003 |
| EP | 1499702 | B1 | 1/2005 |
| EP | 2106437 | B1 | 10/2009 |
| WO | 9421777 | A1 | 9/1994 |
| WO | 9506710 | A1 | 3/1995 |
| WO | 9606154 | A1 | 2/1996 |
| WO | 9722680 | A1 | 6/1997 |
| WO | 03072688 | A1 | 9/2003 |
| WO | 2009040545 | A1 | 4/2009 |
| WO | 2010115582 | A1 | 10/2010 |
| WO | 2010139689 | A1 | 12/2010 |
| WO | 2011146557 | A1 | 11/2011 |
| WO | 2012085534 | A1 | 6/2012 |

OTHER PUBLICATIONS

Ecolab USA Inc., PCT/US2019/022240 filed Mar. 14, 2019, “The International Search Report and the Written Opinion of the International Searching Authority, or the Declaration”, 14 pages, mailed May 23, 2019.

CATEXEL, “Pegasus Chloride 50”, Product Data Sheet, 2 pages, Aug. 2012.

* cited by examiner

NONIONIC SURFACTANT-BASED LIQUID DETERGENT COMPOSITIONS CONTAINING A MANGANESE BLEACH CATALYST

CROSS-REFERENCE TO RELATED APPLICATIONS

This application is a continuation application of U.S. Ser. No. 16/353,424, filed Mar. 14, 2019, which claims priority to Provisional Application U.S. Ser. No. 62/644,823 filed Mar. 19, 2018, which are incorporated herein by reference in their entireties.

FIELD OF THE INVENTION

The invention relates to bleach liquid compositions employing oxidizing bleaching agents and a bleach catalystin a detergent formulation. The liquid bleach catalyst compositions include a surfactant package and other components that create a stable liquid detergent composition for use in cleaning. Methods of use are further provided.

BACKGROUND OF THE INVENTION

Bleach catalysts have been shown to improve bleaching performance when used with active oxygen sources (e.g. peroxide); see for example U.S. Pat. No. 5,246,612. The improved efficacy for bleaching is beneficial for removing stains such as tea and/or coffee as well as starch soils on ware. However, the delivery of catalyst materials in detergent formulations, including highly alkaline compositions, suffers from numerous stability challenges.

The reactivity the bleach catalyst with oxygen requires that the catalyst be added in a separate product from the oxygen source. Bleach catalysts are highly effective at sub ppm concentrations as they react catalytically with the oxidizer to make a more reactive species. Thus the bleach catalyst is added in a product that is predominantly water. Other methods include encapsulating the bleach catalyst, however, such methods do not overcome difficulties in use of catalysts, such as storage instability. Moreover, use of commercially-available catalyst materials (e.g. formulations containing metal and protective ligand) requires protection of the metal/ligand catalyst as opposed to prior art's use of water soluble ligands or complexing agents simply stabilizing the metal catalyst itself. A further disadvantage with encapsulates and granules is that they are generally bound to certain particle size constraints. An additional problem associated with such coatings and/or encapsulation is that the materials providing the protection may themselves have an adverse interaction with the component to be protected. Therefore, in some products stability has been increased by removing any easily oxidizable materials from the compositions. There still, however remains a need to provide dual purpose formulations that are stable which include bleach catalyst in the same composition as a conventional detergent.

BRIEF SUMMARY OF THE EMBODIMENTS

In at least one embodiment a stable liquid detergent formulation is contemplated that includes the bleach catalyst in a detergent composition. Surprisingly Applicants found that a bleach catalyst is stable in a liquid detergent which is greater than 10% water, moderately acidic, and is substantially free (less than 5 wt. %) of anionic surfactant.

In an embodiment, the present invention provides liquid bleach catalyst detergent compositions which include: a highly aqueous buffer, one or more surfactants, a solvent, and water. The composition is essentially free of anionic surfactants. Additional functional materials may also be present in certain embodiments.

In an aspect, the catalyst has the following formula: $[(L_pMn_q)_nX_r]Y_s$, wherein each L independently is an organic ligand containing at least three nitrogen atoms and/or at least two carboxyl groups that coordinate with the Mn metal; wherein each X independently is a coordinating or bridging group selected from the group consisting of $H_2O$, $OH^-$, $SH^-$, $HO_2^-$, $O^{2-}$, $O_2^{2-}$, $S^{2-}$, $F^-$, $Cl^-$, $Br^-$, $I^-$, $NO_3^-$, $NO_2^-$, $SO_4^{2-}$, $SO_3^{2-}$, $PO_4^{3-}$, $N_3^-$, $CN^-$, $NR_3$, $NCS^-$, $RCN$, $RS^-$, $RCO_2^-$, $RO^-$, and

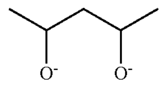

wherein R is a hydrogen or a $C_1$ to $C_6$ alkyl group; wherein p is an integer from 1 to 4;wherein q is an integer from 1 to 2; wherein r is an integer from 0 to 6; wherein Y is a counter ion; and wherein s is the number of counter ions. In some aspects, the detergent includes an alkalinity source selected from the group consisting of alkali metal carbonates, alkali metal silicates, alkali metal metasilicates, alkali metal bicarbonates, alkali metal sesquicarbonates, alkali metal hydroxides, and combinations thereof. In further embodiments the composition includes a highly aqueous buffer so that the pH of the liquid composition is less than 6.0.

In a still further embodiment, the present invention provides methods of cleaning and/or bleaching comprising: providing the liquid detergent compositions; generating a use solution; and contacting a surface or object in need of cleaning and/or bleaching with the use solution of the detergent composition in combination with a bleaching component and an alkalinity source.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

The embodiments of this invention are not limited to particular detergent formulations, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

As used herein, "weight percent," "wt. %," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt. %," etc.

As used herein, the term "about" refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions or different reaction levels for a composition resulting from a particular initial mixture. Whether or not modified by the term "about", the claims include equivalents to the quantities.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virions, viroids, viruses, phages, and some algae. As used herein, the term "microbe" is synonymous with microorganism.

As used herein, a "laundry machine" refers to any device for laundering woven or non-woven textile fabrics in commercially available or experimental wash systems used in the consumer and/or industrial and/or institutional markets; including, but not limited to, continuous washers (e.g., tunnel type continuous batch washers), batch washer extractors, textile-presoak wash systems, steam systems, dry-wash devices and other dry cleaning devices, and/or top or side loading washing machines (e.g., those used in the residential or small institutional markets). This includes laundering systems that are multi-utility wash machines, e.g., those that can presoak, wash, extract, steam, dry, or any combination thereof. A typical laundry facility may consist of multiple single washing machines or continuous load washers (e.g., tunnel washers), or a combination thereof.

As used herein, a "textile" is any woven or non-woven fabric or article, or garment including, but not limited to, all types found in the consumer, industrial, and/or institutional markets including, but not limited to, those made of cotton, poly-cotton blends, wool, aramids, polyurethanes, olefins, polyactids, nylons, silk, hemp, rayon, flax, jute, acrylics, polyesters, those made from many other synthetic or natural fibers and mixtures thereof.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt %, and most preferably the amount of phosphorus is less than 0.01 wt %. The same applies to anionic surfactant free.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "caustic free" or "alkali caustic free" or "substantially caustic" or "substantially alkali caustic free" refers to a composition, mixture, or ingredient that does not contain significant residual and titrate-able carbonate alkalinity from alkali metal hydroxides such as sodium hydroxide or potassium hydroxide, or does not contain an alkali metal hydroxide-containing compound or to which alkali metal hydroxide-containing compound has not been added. The pH of such compositions or mixtures may be below a pH of about 9.0, below a pH of about 8.0 or below a pH of about 7.0. Should an alkali metal hydroxide-containing compound be present through contamination of an alkali metal hydroxide-free composition, mixture, or ingredients, the amount of alkali metal hydroxide or caustic component shall be less than about 0.5 wt %, or less than about 0.2 wt %.

In some embodiments, an alkali metal hydroxide may be used in the composition, mixture, or ingredients for neutralization, stabilization, or pH adjustment purposes. If an alkali metal hydroxide is included for such a purpose, the amount of alkali metal hydroxide or caustic component shall be less than about 10.0 wt %,than about 5.0 wt %, or than about 2.0 wt %.

As used herein, the terms "chelating agent" and "sequestrant" refer to a compound that forms a complex (soluble or not) with water hardness ions (from the wash water, soil and substrates being washed) in a specific molar ratio. Chelating agents that can form a water soluble complex include sodium tripolyphosphate, ethylenediaminetetraacetic acid (EDTA), diethylene triamine pentaacetic acid (DTPA), nitrilotriacetic acid (NTA), citrate, and the like. Sequestrants that can form an insoluble complex include sodium triphosphate, zeolite A, and the like. As used herein, the terms "chelating agent" and "sequestrant" are synonymous.

As used herein, the term "free of chelating agent" refers to a composition, mixture, or ingredients that do not contain a chelating agent or sequestrant or to which a chelating agent or sequestrant has not been added. Should a chelating agent or sequestrant be present through contamination of a composition, mixture, or ingredient that is free of chelating agent, the amount of a chelating agent or sequestrant shall be less than 2 wt. %. In another embodiment, such an amount of a chelating agent or sequestrant is less than 1 wt. %. In other embodiments, such an amount of a chelating agent or sequestrant is less than 0.5 wt. % and in yet other embodiments, such an amount of a chelating agent or sequestrant is less than 0.1 wt. %.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants,* Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

As used herein, the term "disinfectant" refers to an agent that kills all vegetative cells including most recognized pathogenic microorganisms, using the procedure described in *A.O.A.C. Use Dilution Methods,* Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills Mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used in this invention, the term "sporicide" refers to a physical or chemical agent or process having the ability to cause greater than a 90% reduction (1-log order reduction) in the population of spores of *Bacillus cereus* or *Bacillus subtilis* within 10 seconds at 60° C. or within 60 seconds at 50° C. In certain embodiments, the sporicidal compositions of the invention provide greater than a 99% reduction (2-log order reduction), greater than a 99.99% reduction (4-log order reduction), or greater than a 99.999% reduction (5-log order reduction) in such population within 10 seconds at 60° C. or within 60 seconds at 50° C.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbiostatic. A sanitizer and a disinfectant are, by definition, agents which provide antimicrobial or microbiocidal activity. In contrast, a preservative is generally described as an inhibitor or microbiostatic composition As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein the term, "consisting essentially of" in reference to a composition refers to the listed ingredients and does not include additional ingredients that, if present, would affect the cleaning, disinfecting or sterilizing ability of the composition. The term "consisting essentially of" may also refer to a component of the composition. For instance, a surfactant package may consist essentially of two or more surfactants and such surfactant package would not include any other ingredients that would affect the effectiveness of that surfactant package—either positively or negatively. As used herein the term "consisting essentially of" in reference to a method of cleaning refers to the listed steps and does not include additional steps (or ingredients if a composition is included in the method) that, if present, would affect the cleaning ability of the cleaning method.

The present invention contemplates the possibility of omitting any components listed herein. The present invention further contemplates the omission of any components even though they are not expressly named as included or excluded from the invention.

Compositions of the Invention

The liquid detergent compositions of the invention include a bleach catalyst, a solvent, a water carrier, buffer (if needed) and a surfactant, Exemplary ranges of the detergent compositions according to aspects of the invention are shown in Table 1 in weight percentage of the liquid detergent compositions.

TABLE 1

| Material | First Exemplary Range wt. % | Second Exemplary Range wt. % | Third Exemplary Range wt. % |
|---|---|---|---|
| Buffer | 0.000-10 | 0.01-5 | 0.1-3 |
| Solvent | 0.001-10 | 0.01-5 | 0.1-3 |
| Water carrier | 11-99 | 15-90 | 25-80 |
| Bleach Catalyst | 0.01-15 | 0.1-10 | 1-10 |
| Surfactants | 1-60 | 5-50 | 10-50 |
| Additional Functional Ingredients | 0-45 | 0.1-30 | 1-30 |

The liquid detergent compositions are preferably provided as concentrate compositions which may be diluted to form use compositions. In general, a concentrate refers to a composition that is intended to be diluted with water to provide a use solution that contacts an object to provide the desired cleaning, bleaching, or the like. The detergent composition that contacts the articles to be washed can be referred to as a concentrate or a use composition (or use solution) dependent upon the formulation employed in methods according to the invention. It should be understood that the concentration of the catalyst, surfactants, and other additional functional ingredients in the detergent composition will vary depending on liquid concentrate provided and the desired use solution thereof.

In some aspects, the liquid, bleach catalyst detergent compositions maintain shelf stability for at least about 1 year at room temperature.

Catalyst

The bleach catalyst detergent compositions according to the invention include at least one catalyst. The term "catalyst," as used herein, refers to an agent, such as transition metals, used to activate a source of oxygen, such as hydrogen peroxide and/or percarbonate, providing improved bleaching activity and/or bubbling of a use solution to provide enhanced cleaning efficacy. In an aspect, catalysts are suitable for converting or decomposing active oxygen sources (i.e. oxidation) to generate catalytically enhanced bleaching species. For example, Mn (II) or Mn (III) are readily oxidated to form Mn (IV) species (turning to $MnO_2$), in particular when combined with oxidants and/or in an alkaline environment.

In an aspect of the invention, the catalyst agent is metallic. In a further aspect, the catalyst agent is can include various forms of metallic agents, including transition metals, including for example manganese.

In some aspects, the catalyst agent includes at least once source of manganese. In some embodiments, the manganese source is derived from manganese metal, manganese oxides, colloidal manganese, inorganic or organic complexes of manganese, including manganese sulfate, manganese carbonate, manganese acetate, manganese lactate, manganese nitrate, manganese gluconate, or manganese chloride, or any of the salts of salt forming species with manganese. Exemplary manganese-gluconate complexes are described in EP0237111; manganese-bi-pyridylamine complexes are described in EP0392593; and manganese-polyol complexes are described in EP0443651, as peroxygen bleach catalysts.

Commercially-available manganese catalysts are sold under the tradename Bleach catalyst (Di[manganese(1+)], 1,2-bis(octahydro-4,7-dimethyl-1H-1,4,7-triazonine-1-yl-$kN^1$, $kN^4$, $kN^7$)-ethane-di-μ-oxo-μ-(ethanoato-kO, kO')-, di[chloride (1-)]), or Dragon (also known as Dragon's Blood or Dragon A350) (bis(octahydro-1,4,7-trimethyl-1H-1,4,7-triazonine-$kN^1$, $kN^4$, $kN^7$)-tri-μ-oxo-Di[manganese(1+)] sulfate tetrahydrate), available from Catexel Ltd.

In an aspect, the catalyst agent is a manganese-based complex that is a mononuclear or dinuclear complex of a Mn(III) or Mn(IV) transition metal. In a further aspect, the catalyst agent contains at least one organic ligand containing at least three nitrogen atoms that coordinate with the manganese. An exemplary structure is 1,4,7-triazacyclononane (TACN), 1,4,7-trimethyl-1,4,7-triazacyclononane (Me-TACN), 1,5,9-triazacyclododecane, 1,5,9-trimethyl-1,5,9-triazacyclododecane (Me-TACD), 2-methyl-1,4,7-triazacyclononane (Me/TACN), 2-methyl-1,4,7-trimethyl-1,4,7-triazacyclononane (Me/Me-TACN), N,N',N"-(2-hyroxyethyl)1,4,7-triazacyclononane. In a preferred embodiment, the ratio of the manganese atoms to the nitrogen atoms is 1:3.

Catalysts can also contain from 0 to 6 coordinating or bridging groups per manganese atom. When the manganese based catalyst is a mononuclear complex, coordinating groups are for example selected from —OMe, —O—$CH_2$—$CH_3$, or —O—$CH_2$—$CH_2$—$CH_3$. When the manganese based catalyst is a dinuclear complex, bridging groups may be selected, among others, from —O—, —O—O—, or —O—CH(Me)—O—. The catalyst can also contain one or more monovalent or multivalent counter ions leading to charge neutrality. The number of such monovalent or multivalent counter ions will depend on the charge of the manganese complex which can be 0 or positive. The type of the counter ions needed for the charge neutrality of the complex is not critical and the counter ions may be selected for example from halides such as chlorides, bromides and iodides, pseudohalides, sulphates, nitrates, methylsulfates, phosphates, acetates, perchlorates, hexafluorophosphates, or tetrafluoro-borates.

The catalysts suitable for use according to the invention may be defined according the following formula: $[(L_pMn_q)_nX_r]Y_s$, wherein each L independently is an organic ligand containing at least three nitrogen atoms and/or at least two carboxyl groups that coordinate with the Mn metal; each X independently is a coordinating or bridging group selected from the group consisting of $H_2O$, $OH^-$, $SH^-$, $HO_2^-$, $O^{2-}$, $O_2^{2-}$, $S^{2-}$, $F^-$, $Cl^-$, $Br^-$, $I^-$, $NO_3^-$, $NO_2^-$, $SO_4^{2-}$, $SO_3^{2-}$, $PO_4^{3-}$, $N_3^-$, $CN^-$, $NR_3$, $NCS^-$, RCN, $RS^-$, $RCO_2^-$, $RO^-$, and

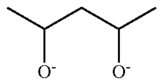

with R being hydrogen or a $C_1$ to $C_6$ alkyl group; p is an integer from 1 to 4; q is an integer from 1 to 2; r is an integer from 0 to 6; Y is a counter ion; and s is the number of counter ions.

The catalysts suitable for use according to the invention may also be defined according the following formula for a dinuclear manganese complex:

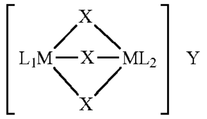

Wherein M is a Mn metal; $L_1$ and $L_2$ can either be separate ligands or where $L_1$ and $L_2$ can combine to be a single molecule. Among the coordinating or bridging groups, the groups $O^{2-}$, $O_2^{2-}$, $CH_3O$—, $CH_3CO^{2-}$,

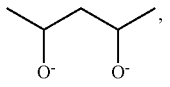

or Cl— are particularly preferred. In some aspects, the ligands are selected from the group consisting triazacyclononane, triazacyclononane derivatives, Schiff-base containing ligands, polypyridineamine ligands, pentadentate nitrogen-donor ligands, bispidon-type ligands, and macrocyclic tetraamidate ligands. Examples for those classes of ligands are described by R. Hage and A Lienke (Hage, Ronald; Lienke, Achim. Applications of Transition-Metal Catalysts to Textile and Wood-Pulp Bleaching. Angewandte Chemie International Edition, 2005, 45. Jg., Nr. 2, pp. 206-222), which is incorporated herein by reference in its entirety. Another group of preferred ligands are dicarboxylates, in particular oxalate.

Examples of catalyst structures that are particularly useful in the bleach catalyst detergent compositions according to the invention include the following:

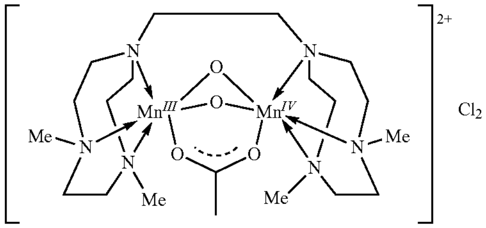

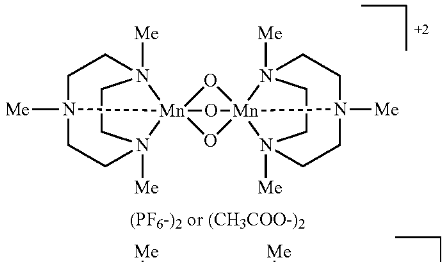

$(PF_6^-)_2$ or $(CH_3COO^-)_2$

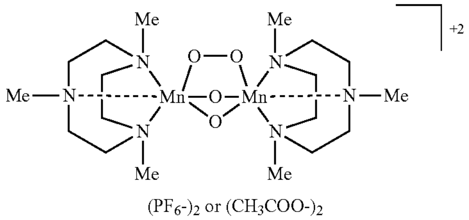

$(PF_6^-)_2$ or $(CH_3COO^-)_2$

-continued

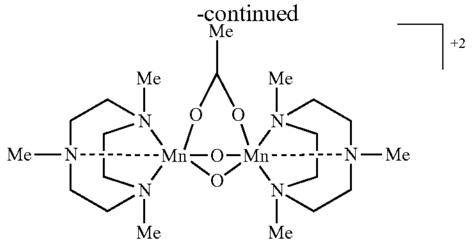

$(PF_6^-)_2$ or $(CH_3COO^-)_2$

Additional disclosure of metal complexes for catalysts is provided for example, in U.S. Pat. Nos. 5,227,084, 5,194,416, 4,728,455, 4,478,733, and 4,430,243, and European Patent Nos. 693,550, 549,271, 549,272, 544,519, 544,490, 544,440, 509,787, 458,397 and 458,398, each of which is herein incorporated by reference in its entirety.

In aspects of the invention, the catalyst has a concentration in liquid, bleach catalyst detergent compositions from about 0.01 wt. % to about 15 wt. %, from about 0.1 wt. % to about 10 wt. %, or from about 0.5 wt. % to about 5 wt. %. It is to be understood that all values and ranges between these values and ranges are encompassed by the invention.

As one skilled in the art will ascertain from the description herein of the bleach catalyst detergent compositions, the amounts of catalysts employed in the liquid compositions is a relatively small quantity, including down to the hundredths of a percent in a use solution for example, which are quantities much lower than bleach precursors which are often formulated into a detergent composition. Beneficially, the liquid detergent formulations according to the invention providing the catalyst allow the formulation of the manganese-complex catalysts directly into the liquid formulations and to be readily dissolved into a use solution of the bleach catalyst detergent composition.

Water Carrier

In some embodiments, the compositions of the invention further include a polar carrier such as water. The water may be provided by the use of aqueous reagents, viz. oxidizing agent, alkalinity source. In other embodiments, an additional amount of water is added to the compositions.

The compositions may include an effective amount of solvent. In some embodiments, the compositions may include about at least about 10 wt. % to about 99 wt. % of water, 15 wt. % to about 99 wt. % or about 20 wt % to about 80 wt. % of water. It is to be understood that all values and ranges between these values and ranges are encompassed by the present invention.

Surfactants

In some embodiments, the compositions of the present invention include a surfactant or surfactant system. A variety of surfactants can be used in a detergent compositions, including, but not limited to: nonionic, cationic, and zwitterionic surfactants. The composition preferably does not include or includes less than about 5 wt % of anionic surfactant. Exemplary surfactants that can be used are commercially available from a number of sources. For a discussion of surfactants, see for example, Kirk-Othmer, Encyclopedia of Chemical Technology, Third Edition, volume 8, pages 900-912, “Surface Active Agents and Detergents,” Vol. I and II by Schwartz, Perry and Berch, each of which are herein incorporated by reference in its entirety.

Non-limiting examples of anionic surfactants to be avoided in the detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Non-limiting examples of nonionic surfactants useful in the detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers.

Non-limiting examples of cationic surfactants that can be used in the detergent composition include, but are not limited to: amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl(C12-C18)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Non-limiting examples of zwitterionic surfactants that can be used in the detergent composition include, but are not limited to: betaines, imidazolines, and propionates.

In some aspects, where the detergent composition is intended to be used in an automatic dishwashing or ware washing machine, the surfactants selected, if any surfactant is used, can be those that provide an acceptable level of foaming when used inside a dishwashing or ware washing machine. It should be understood that ware washing compositions for use in automatic dishwashing or ware washing machines are generally considered to be low-foaming compositions.

When the detergent composition includes a surfactant as a cleaning agent, the cleaning agent is provided in an amount effective to provide a desired level of cleaning. In some embodiments, the compositions of the present invention include about 1 wt. % to about 60 wt. % of a surfactant. In other embodiments the compositions of the present invention include about 5 wt. % to about 50 wt. % of a surfactant. In still yet other embodiments, the compositions of the present invention include about 10 wt. % to about 50 wt. % of a surfactant, or from about 15 wt. % to about 45 wt. % of a surfactant.

Neutralizing Agents and pH Adjustment Agents

One or more neutralizing agents and/or one or more pH adjustment agents may be incorporated into the composition in order to bring the pH of the composition to the desired levels. Examples of neutralizing agents and pH adjustment agents that may be mentioned are triethanolamine, aminomethylpropanol, ammonium hydroxide, sodium hydroxide, other alkaline hydroxides, alkaline carbonates such as sodium carbonate, alkaline silicates such as sodium silicate, ascorbic acid and salts thereof, sorbic acid and salts thereof, phosphoric acid and salts thereof, citric acid and salts thereof, lactic acid and salts thereof, glycolic acid and salts thereof, boric acid and salts thereof, acetic acid and salts thereof, and their analogs. The pH adjusting agent of buffer is preferably highly aqueous. Preferably, the pH-adjusting agent or agents are used in the composition of the invention in a quantity sufficient to provide a pH less than 6. Preferably, the pH-adjusting agent(s) is(are) used in a quantity sufficient to provide the composition with a pH of 3 to less than 6, preferably 4 to less than 6.

Solvent

The liquid laundry detergent composition may comprise a solvent. The solvent may be selected from the group comprising, glycerol, p-diol, propylene glycol, dipropylene glycol, polypropylene glycol, diethylene glycol, ethanol, isopropanol, butenol and mixtures thereof. In some embodiments, a solvent may be included in the compositions at an amount of from about 0.01 to about 8 wt %, from about 0.05 to about 5 wt %, and from about 0.10 to about 3 wt %.

Additional Functional Ingredients

The components of the detergent composition can further be combined with various functional components. In some embodiments, the liquid, bleach catalyst detergent composition including the bleaching component, catalyst, alkalinity source and surfactants make up a large amount, or even substantially all of the total weight of the detergent composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash and/or laundry applications. However, other embodiments may include functional ingredients for use in other applications.

In some embodiments, the compositions may include solvents, activating agents, defoaming agents, enzymes, anti-redeposition agents, additional bleaching agents, solubility modifiers, dispersants, rinse aids, metal protecting agents, stabilizing agents, corrosion inhibitors, surface modification polymers, such as soil release polymers, starches, fluid repellants, whitening additives, such as optical brighteners or hueing agents, additional sequestrants and/or chelating agents, fragrances and/or dyes, rheology modifiers or thickeners, hydrotropes or couplers, buffers, solvents and the like.

Enzymes

In certain embodiments at least one or more enzymes selected from protease, mannanase, pectate lyase, cutinase, esterase, lipase, amylase, and cellulase may be present in the compositions. Less preferred additional enzymes may be selected from peroxidase and oxidase. The enzymes are preferably present with corresponding enzyme stabilizers. The total enzyme content is preferably at least 2 wt %, even as high as at least 4 wt %.

Sequestrants

Sequestrants may be included in some embodiments. Preferred sequestrants include organic phosphonates, alkanehydroxy phosphonates and carboxylates available under the DEQUEST trade mark from Thermphos. The preferred sequestrant level is less than 10 wt % and preferably less than 5 wt % of the composition. A particularly preferred sequestrant is HEDP (1-Hydroxyethylidene-1,1,-diphosphonic acid), for example sold as Dequest 2010. Also suitable but less preferred as it gives inferior cleaning results is Dequest® 2066 (Diethylenetriamine penta(methylene phosphonic acid or Heptasodium DTPMP).

Chelants

In some embodiments, the compositions include a chelant/sequestering agent. Suitable chelating/sequestering agents are, for example, citrate, aminocarboxylic acid, condensed phosphate, phosphonate, and polyacrylate. In general, a chelating agent is a molecule capable of coordinating (i.e., binding) the metal ions commonly found in natural water to prevent the metal ions from interfering with the action of the other detersive ingredients of a cleaning composition. In general, chelating/sequestering agents can generally be referred to as a type of builder. The chelating/sequestering agent may also function as a threshold agent when included in an effective amount. The concentrated detergent composition can include 0.1 to 70% by weight, preferably 5 to 60% by weight, more preferably 5 to 50% by weight, most preferably 10 to 40% by weight of a chelating/sequestering agent.

Suitable aminocarboxylic acids include, for example, methylglycinediacetic acid (MGDA), N-hydroxyethyliminodiacetic acid, nitrilotriacetic acid (NTA), ethylenediaminetetraacetic acid (EDTA), N-hydroxyethyl-ethylenediaminetriacetic acid (HEDTA), and diethylenetriaminepentaacetic acid (DTPA). Examples of condensed phosphates include sodium and potassium orthophosphate, sodium and potassium pyrophosphate, sodium tripolyphosphate, sodium hexametaphosphate, and the like. A condensed phosphate may also assist, to a limited extent, in liquidification of the composition by fixing the free water present in the composition as water of hydration. The composition may include a phosphonate such as 1-hydroxyethane-1,1-diphosphonic acid $CH_3C(OH)[PO(OH)_2]_2$ (HEDP); amino tri(methylenephosphonic acid) $N[CH_2PO(OH)_2]_3$; aminotri(methylenephosphonate), sodium salt $(NaO)(HO)P(OCH_2N[CH_2PO(ONa)_2]_2)$; 2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2)POCH_2N[(CH_2)_6N[CH_2PO(OH)_2]_2]_2$; and phosphorus acid $H_3PO_3$.

The chelating/sequestering agent may also be a water conditioning polymer that can be used as a form of builder. Exemplary water conditioning polymers include polycarboxylates. Exemplary polycarboxylates that can be used as water conditioning polymers include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. The concentrated detergent composition may include the water conditioning polymer in an amount of 0 to 20% by weight, preferably 0.1 to 5% by weight.

Defoaming Agents

In some embodiments, the compositions include a defoaming agent, which may be in addition to low or no-foaming surfactants. In some aspects, suitable defoaming agents include, for example, ethylene oxide/propylene block copolymers such as those available under the name Pluronic N-3, silicone compounds such as silica dispersed in polydimethylsiloxane, polydimethylsiloxane, and functionalized polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate.

Color Stabilizing Agent

In some embodiments, the compositions optionally include a color stabilizing agent. A color stabilizing agent can be any component that is included to inhibit discoloration or browning of the composition. In some embodiments, a color stabilizing agent may be included in the compositions at an amount of from about 0.01 to about 5 wt %, from about 0.05 to about 3 wt %, and from about 0.10 to about 2 wt %.

Optical Brighteners

In some embodiments, the compositions optionally include an optical brightener. Brighteners are added to laundry detergents to replace whitening agents removed during washing and to make the clothes appear cleaner. Optical brighteners may include dyes that absorb light in the ultraviolet and violet region (usually 340-370nm) of the electromagnetic spectrum, and re-emit light in the blue region (typically 420-470 nm). These additives are often used to enhance the appearance of the color of a fabric, causing a perceived "whitening" effect, making materials look less yellow by increasing the overall amount of blue light reflected. In some embodiments, optical brighteners suitable for inclusion in the compositions, include, but are not limited to, triazine-stilbenes (di-, tetra- or hexa-sulfonated), coumarins, imidazolines, diazoles, triazoles, benzoxazolines, biphenyl-stilbenes, and mixtures thereof. One or more optical brighteners may be used in the compositions. In some embodiments, optical brighteners are included in the compositions at an amount of from about 0.1 to about 5 wt %, from about 0.15 to about 3 wt %, or from about 0.2 to about 2 wt %. Examples of commercially available optical brighteners suitable for use in the compositions include, but are not limited to, DMS-X and CBS-X, a distyryl biphenyl derivative, both available from Vesta-Intracon BV.

Soil Antiredeposition Agents

In some embodiments, the compositions may optionally include antiredeposition agents. Without wishing to be bound by any particular theory, it is thought that antiredeposition agents aid in preventing loosened soil from redepositing onto cleaned fabrics. Antiredeposition agents may be made from complex cellulosic materials such as carboxymethylcellulose (CMC), or synthetic materials such as polyethylene glycol and polyacrylates. In other embodiments, polyphosphate builders may be included as an antiredeposition agent.

Alkalinity Sources

The liquid bleach catalyst detergent compositions of the present invention include at least one alkalinity source. In some aspects, the alkalinity source(s) function as a hydratable salt to form the liquid compositions. In some aspects, the hydratable salt can be referred to as substantially anhydrous. As one skilled in the art will ascertain from the disclosure herein, there may also be included with the alkalinity source(s) in the liquid detergent composition water of hydration to hydrate the alkalinity source(s). It should be understood that the reference to water includes both water of hydration and free water.

In some aspects, the alkalinity source(s) includes alkali metal carbonates. In some aspects, the alkalinity source(s) may include alkali metal hydroxides and/or alkali metal silicates. Examples of suitable alkalinity sources include but are not limited to: sodium hydroxide, potassium hydroxide, sodium carbonate, potassium carbonate, sodium silicate, potassium silicate, a mixture of alkali metal hydroxides, a mixture of alkali metal carbonates, a mixture of alkali metal silicates, and any mixtures of the same. In additional aspects, the alkalinity source(s) may include alkali metal metasilicates, bicarbonates, sesquicarbonates, and mixtures thereof.

The alkalinity source(s) largely control the pH of the resulting solution when water is added to the detergent composition to form a use solution. In some aspects, the alkalinity source(s) (e.g. sodium carbonate) provide a milder alkaline detergent, such as a pH greater than about 7; such as disclosed in U.S. Pat. No. 7,094,746, which is incorporated herein by reference in its entirety. In other aspects, the alkalinity source(s) provide a high alkaline detergent. In such aspects, The pH of the use solution is between approximately 10 and approximately 13 in order to provide sufficient detergency properties. In some aspects, the pH of the use solution is between about 10 and about 12. Beneficially, the bleach catalyst detergent compositions can be formulated into alkaline and/or highly alkaline detergent compositions while still protecting the catalyst material.

In aspects of the invention the alkalinity sources are included in the liquid bleach catalyst detergent compositions, at a concentration of from about 10 wt. % to about 90 wt. %, from about 25 wt. % to about 90 wt. %, from about 30 wt. % to about 90 wt. %, from about 20 wt. % to about 70 wt. %, from about 40 wt. % to about 80 wt. %, from about 40 wt. % to about 75 wt. %, from about 30 wt. % to about 60 wt. %, or from about 30 wt. % to about 50 wt. %. It is to be understood that all values and ranges between these values and ranges are encompassed by the invention. The alkalinity source and peroxide bleaching agent are typically added in a separate component apart from the detergen composition.

Oxidizing Agent

The compositions also include an oxidizing agent. The oxidizing agent may include a peroxide source. Oxidizing agents suitable for use with the compositions include the following types of compounds or sources of these compounds, or alkali metal salts including these types of compounds, or forming an adduct therewith: hydrogen peroxide, urea-hydrogen peroxide complexes or hydrogen peroxide donors of: group 1 (IA) oxidizing agents, for example lithium peroxide, sodium peroxide; group 2 (IIA) oxidizing agents, for example magnesium peroxide, calcium peroxide, strontium peroxide, barium peroxide; group 12 (IIB) oxidizing agents, for example zinc peroxide; group 13 (IIIA) oxidizing agents, for example boron compounds, such as perborates, for example sodium perborate hexahydrate of the formula $Na_2[B_2(O_2)_2(OH)_4]\cdot 6H_2O$ (also called sodium perborate tetrahydrate); sodium peroxyborate tetrahydrate of the formula $Na_2B_2(O_2)_2[(OH)_4]\cdot 4H_2O$ (also called sodium perborate trihydrate); sodium peroxyborate of the formula $Na_2[B_2(O_2)_2(OH)_4]$ (also called sodium perborate monohydrate); group 14 (IVA) oxidizing agents, for example persilicates and peroxycarbonates, which are also called percarbonates, such as persilicates or peroxycarbonates of alkali metals; group 15 (VA) oxidizing agents, for example peroxynitrous acid and its salts; peroxyphosphoric acids and their salts, for example, perphosphates; group 16 (VIA) oxidizing agents, for example peroxysulfuric acids and their salts, such as peroxymonosulfuric and peroxydisulfuric acids, and their salts, such as persulfates, for example, sodium persulfate; and group VIIa oxidizing agents such as sodium periodate, potassium perchlorate. Other active inorganic oxygen compounds can include transition metal peroxides; and other such peroxygen compounds, and mixtures thereof.

In some embodiments, the compositions of the present invention employ one or more of the inorganic oxidizing agents listed above. Suitable inorganic oxidizing agents include ozone, hydrogen peroxide, hydrogen peroxide adduct, group IIIA oxidizing agent, or hydrogen peroxide donors of group VIA oxidizing agent, group VA oxidizing agent, group VIIA oxidizing agent, or mixtures thereof. Suitable examples of such inorganic oxidizing agents include percarbonate, perborate, persulfate, perphosphate, persilicate, or mixtures thereof.

In some embodiments, the oxidizing agent includes hydrogen peroxide, or a source or donor of hydrogen peroxide. In other embodiments, the oxidizing agent includes a peroxide source selected from a percarbonate, a perborate urea hydrogen peroxide, PVP-peroxides and mixtures thereof.

The compositions may contain an effective amount of an oxidizing agent. In some embodiments, the compositions include about 0.001 wt. % to about 60 wt. % of the oxidizing agent, or about 1 wt. % to about 25 wt. % of the oxidizing agent. In some embodiments, the compositions include about 30 wt. % to about 50 wt. % of the oxidizing agent. It is to be understood that all ranges and values between these ranges and values are encompassed by the present invention.

Methods of Use

In some aspects, the bleach catalyst detergent compositions are suitable for use in various applications that requires protection of a catalyst material from other components in a formula (e.g. alkalinity). Without being limited according to the applications of use of the invention, the bleach catalyst compositions are particularly suitable for the protection of oxidation catalysts in bleaching systems, such as for laundry and ware washing. In particular, the bleaching systems may include ware wash detergents, coffee and/or tea destainers, clean-in-place (CIP) applications employing peroxygen activation catalysts for peroxide or peracid cleaners, surgical instrument cleaning and the like, laundry applications, and the like. In aspects, the bleach product (e.g. inactivated sodium percarbonate) is combined with the detergent compositions according to the invention.

In a further aspect however, the bleach catalyst compositions are suitable for protection of oxidation catalysts in wastewater treatment, epoxidation reactions, and many other applications. In such applications there is a need for the removal of microbes (e.g. wastewater treatment) from wastewater which is often rich in malodorous compounds of reduced sulfur, nitrogen, phosphorous and the like. In such aspects, detergent compositions containing a strong oxidant are employed to convert these compounds efficiently to their odor free derivatives e.g. the sulfates, phosphates and amine oxides. These same properties are very useful in the treatment of other water sources, including industrial applications (e.g. treatment of slick water and other applications customary in oil and/or gas drilling) where the property of bleaching is also of great utility.

In still further aspects, the bleach catalyst compositions are suitable for protection of oxidation catalysts in pulp and paper bleaching. As referred to herein, pulp and paper bleaching may be employed in the "papermaking process," referring to methods of making paper products from pulp generally comprising forming an aqueous cellulosic papermaking furnish, draining the furnish to form a sheet and drying, the sheet. The steps of forming the papermaking furnish, draining, and drying may be carried out in any conventional manner generally known to those skilled in the art. The pulp may be any either or both of virgin pulp and recycled pulp.

In some aspects, the bleach catalyst detergent compositions are preferably for use in an automatic washing detergent formulation e.g. such as a dishwasher detergent or a laundry detergent.

In some aspects, the detergent compositions are contacted by a diluent, such as water to generate a concentrate and/or use solution for the various applications of use. The detergent compositions can include concentrate compositions or can be diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as the use composition. The use solution can include additional functional ingredients at a level suitable for cleaning, bleaching, or the like.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In one embodiment, the concentrate is diluted at a ratio of between about 1:10 and about 1:1000 concentrate to water. Particularly, the concentrate is diluted at a ratio of between about 1:100 and about 1:5000 concentrate to water.

In some aspects, the concentrate compositions according to the invention are provided in the dilution range of about 0.01 g/L to about 10 g/L, from about 0.1 g/L to 10 g/L, from about 0.4 g/L to 5.5 g/L, or from about 0.5 g/L to 5 g/L, which will depend upon the dosing required for a particular application of use (e.g. ware wash detergent, laundry detergent, or the like).

In some aspects, the use solutions according to the invention provide a desired level of catalyst from about 0.01 ppm to about 5 ppm, from about 0.02 ppm to about 5 ppm, from about 0.05 ppm to about 2 ppm.

In some aspects, the use solution is combined with a source of active oxygen for activation and/or enhanced bleaching according to various methods of use thereof. In an aspect, the active oxygen source is added concurrently (e.g. during a wash step) with the detergent composition use solution. Beneficially, the bleach catalyst is available to provide activation of the bleach source and therefore increase overall stain removal.

In some aspects, the present invention provides methods for removing soils from a surface, e.g., a hard surface, and/or bleaching a surface. In some embodiments, the method comprises applying a use solution of the detergent composition (e.g. contacting) to the surface, and removing the composition from the surface after an amount of time sufficient to facilitate soil removal and/or bleaching. The contacting step can last for any suitable time. In some embodiments, the contacting step lasts for at least 10 seconds, 20 seconds, 30 seconds, 40 seconds, 50 seconds, 1 minute, 10 minutes, 30 minutes, 1 hour, 2 hours, 4 hours, 8 hours, 16 hours, 1 day, 3 days, 1 week, or longer. The detergent composition can be applied to the surface (or target for soil removal and/or bleaching) in any suitable manner. In some embodiments, the detergent composition is applied by means of a spray, a foam, or the like.

The methods can be used to achieve any suitable removal of soil (e.g. cleaning), sanitizing, disinfecting, bleaching and/or reduction of the microbial population in and/or on the surface or target. In some embodiments, the methods can be used to reduce the microbial population by at least one log10. In other embodiments, the present methods can be used to reduce the microbial population in and/or on the target or the treated target composition by at least two log10. In still other embodiments, the present methods can be used to reduce the microbial population in and/or on the target or the treated target composition by at least three log10.

In some embodiments, the method further comprises rinsing the surface. In some embodiments, the method further comprises generating a bubbling effect of the detergent compositions containing the active oxygen source and catalyst (and/or an active oxygen source combined with the detergent composition containing the catalyst). In some embodiments, the method further comprises a mechanical application of force, agitation and/or pressure to assist in removing the soils and/or bleaching the surface.

The methods of the present invention can be used to remove a variety of soils from a variety of surfaces and/or bleaching a variety of surfaces. For example, surfaces suitable for cleaning using the methods of the present invention include, but are not limited to, walls, floors, ware, dishes, flatware, pots and pans, heat exchange coils, ovens, fryers, smoke houses, sewer drain lines, and the like.

In some embodiments, the methods of the present invention are followed by only a rinse step. In other embodiments, the methods of the present invention are followed by a conventional CIP method suitable for the surface to be cleaned. In still yet other embodiments, the methods of the present invention are followed by a CIP method such as those described in U.S. Pat. Nos. 8,398,781 and 8,114,222 entitled "Methods for Cleaning Industrial Equipment with Pre-treatment," both of which are hereby incorporated by reference in their entirety.

Beneficially, according to the various aspects, the methods protect catalysts formulated within an alkaline liquid bleach catalyst detergent compositions prior to a point of use.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

TABLE 1

High aqueous system examples of liquid detergent containing a bleach catalyst

| Chemical name | Tradename | 0% water | 10% water | 30% water | 45% water | 75% water |
|---|---|---|---|---|---|---|
| DI water | | | 9.86 | 29.86 | 44.86 | 73.56 |
| Optical Brightener | Tinopal CBS-X | | | | | 0.3 |
| Sodium Acetate Trihydrate | | | 0.01 | 0.01 | 0.01 | 0.01 |
| Glacial Acetic Acid | | | 0.05 | 0.05 | 0.05 | 0.05 |
| Propylene Glycol | | 14.92 | 5 | 10 | 15 | 2 |
| Linear Alcohol C12-16 7EO | Surfonic L24-7 | 63.75 | 63.75 | 45 | 30 | 18 |
| | Lutensol XP-50 | 21.25 | 21.25 | 15 | 10 | 6 |
| | Mn Bleach Catalyst 50% | 0.08 | 0.08 | 0.08 | 0.08 | 0.08 |
| | TOTAL | 100 | 100 | 100 | 100 | 100 |

Mix Instructions:

All materials were added in the order listed with the exception that a small amount of water (in all examples with water) was withheld and used to make a presolution of the Bleach catalyst Cl prior to its addition. All examples with water were buffered at pH 4.

TABLE 2

Buffered examples of liquid detergent containing a bleach catalyst

| Chemical name | Tradename | pH 4 | pH 6 | pH 7.5 | pH 8.5 | pH 10.5 |
|---|---|---|---|---|---|---|
| DI water | | 73.56 | 73.62 | 71.28 | 73.39 | 73.46 |
| Optical Brightener | Tinopal CBS-X | 0.3 | 0.3 | 0.3 | 0.3 | 0.3 |
| Propylene Glycol | | 2 | 2 | 2 | 2 | 2 |
| Linear Alcohol | Surfonic L24-7 | 18 | 18 | 18 | 18 | 18 |
| | Lutensol XP-50 | 6 | 6 | 6 | 6 | 6 |
| Sodium Acetate Trihydrate | | 0.01 | | 2.34 | 0.02 | 0.01 |

TABLE 2-continued

Buffered examples of liquid detergent containing a bleach catalyst

| Chemical name | Tradename | pH 4 | pH 6 | pH 7.5 | pH 8.5 | pH 10.5 |
|---|---|---|---|---|---|---|
| Glacial Acetic acid | | 0.05 | | | 0.08 | 0.08 |
| Sodium hydroxide 50% | | | | | 0.13 | 0.1 |
| | Mn Bleach catalyst | 0.08 | | | | |
| | TOTAL | 100 | 100 | 100 | 100 | 100 |

Mix Instructions:

All materials were added in the order listed with the exception that a small amount of water withheld and used to make a presolution of the Bleach catalyst Cl prior to its addition. The pH was checked using a pH meter prior to the addition of Bleach catalyst Cl.

TABLE 3

Anionic surfactant examples of liquid detergent containing a bleach catalyst

| Chemical name | Tradename | Nonionic only | 4% LAS | 4% SLES | 2% Lauric Acid |
|---|---|---|---|---|---|
| DI water | | 73.56 | 67.62 | 69.56 | 71.57 |
| Optical Brightener | Tinopal CBS-X | 0.3 | 0.3 | 0.3 | 0.3 |
| Sodium Acetate Trihydrate | | 0.01 | 2 | 0.01 | |
| Glacial Acetic Acid | | 0.05 | | 0.05 | 0.05 |
| Propylene glycol | | 2 | 2 | 2 | 2 |
| Linear alcohol (C12-C16 7EO | Sufonic L24-7 | 18 | 18 | 18 | 18 |
| | Lutensol XP-50 | 6 | 6 | 6 | 6 |
| Linear Alkylbenzene sulfoante | Biosoft S-101 | | 4 | | |
| Sodium Lauryl Ether Sulfate 60% | | | | 4 | |
| Lauric acid | Emory 652 | | | | 2 |
| | Pegasus Cl 50% | 0.06 | 0.06 | 0.06 | 0.06 |
| | TOTAL | 100 | 100 | 100 | 100 |

Mix Instructions:

All materials were added in the order listed with the exception that a small amount of water withheld and used to make a presolution of the bleach catalyst Cl prior to its addition. The pH was checked using a pH meter prior to the addition of bleach catalyst C to ensure a pH of 4.

Example 2

The formulas described in Tables 1, 2, and 3 were prepared and stored to test the long term chemical stability of the bleach catalyst. In order to provide accelerated aging conditions, the formulas were stored at 120 F and tested periodically over time to determine which formula maintained a chemically stable bleach catalyst. In order to measure the bleaching performance, the detergents were tested using a 10 minute, 1 L Tergotometer at 120 F with 5 grain water and the following doses of chemistry:

| Chemistry | Dose (g/L) |
|---|---|
| Test Detergent | 0.5 |
| Hydrogen Peroxide, 35% | 1 |
| Sodium Hydroxide, 50% | 0.55 |

The test was run each time in duplicate, with 3 Tea on Cotton swatches (CFT BC-1 Tea on Cotton) in each Tergotometer pot. The percent stain removal was calculated by measuring the reflectance of the stain on the swatches before and after the Tergotometer on the spectrophotometer (ColorQuest XE, Hunter Associates Laboratory). The L* value is one of the color indices and is indicative of broad visible spectrum reflectance, where 100% is considered completely white. The % stain removal was calculated using formula 1.

$$\% SR=((L^*_{Final}-L^*_{Initial})/(96-L^*_{Initial}))*100$$

Formula 1: Equation of % stain removal

The testing was broken down into three defining characteristics about the stable detergent with Bleach catalyst: high aqueous system, moderately acidic, and free of anionic surfactant.

High Aqueous System:

Examples described in Table 1 were tested using the procedure outlined in the beginning of this section. The % removal of tea from cotton using these detergents made with varying percentage of water is described below (Table 4).

TABLE 4

Percent stain removal from tea swatches over time of detergents with varying percentage of water, all stored at 120 F.

| | % Stain Removal | | | | | | |
|---|---|---|---|---|---|---|---|
| Day | 0% Water | 10% Water | 30% Water | 45% Water | 75% Water | Hydrogen Peroxide Only | Hydrogen Peroxide and Pegasus |
| 0 | 61.41 | 63.54 | 62.74 | 61.47 | 61.68 | 31.14 | 59.94 |
| 7 | | 53.75 | 64.62 | 63.51 | 62.06 | | |
| 14 | 31.84 | 45.65 | 61.67 | 61.23 | 58.76 | | |
| 28 | | 34.09 | 55.50 | 55.92 | 55.56 | | |

In the examples were the percentage of water in the formula is 10 or lower, the bleaching performance declines all the way down to the level of the hydrogen peroxide only example. This indicates complete instability of the Bleach catalyst in these formulations. In every other example, which has 30% or more water, the % stain removal remains essentially the same as the initially starting value. As long as the formula has 30% or more water in the formula, the Bleach catalyst is chemically stable.

Moderately Acidic:

The examples disclosed in Table 2 were tested as described in the opening paragraph of this section. The % tea stain removal from cotton the detergents delivered over the testing period is described in table 5 below.

TABLE 5

Percent stain removal from tea swatches over time of buffered detergents with bleach catalyst, stored at 120 F.

| | % Soil Removal | | | | | | |
|---|---|---|---|---|---|---|---|
| Day | pH 4 | pH 6 | pH 7.5 | pH 8.5 | pH 10.5 | Hydrogen Peroxide Only | Hydrogen Peroxide and Pegasus |
| 0 | 61.68 | 61.85 | 62.40 | 61.60 | 56.47 | 31.14 | 59.94 |
| 7 | 62.06 | 60.89 | 53.33 | | 52.22 | | |
| 14 | 58.76 | 59.60 | 59.63 | 58.79 | 50.89 | | |
| 21 | | 60.93 | | 52.67 | 45.80 | | |
| 28 | | 51.19 | 49.35 | 52.44 | 44.13 | | |
| 42 | 58.65 | | | | | | |

In the examples where the concentrate detergent pH is above 4, the bleaching performance declines over the testing. This corresponds to a loss in activity of bleach catalyst in the detergent. In the examples of pH 6, 7.5, and 8.5, while the stain removal is not reduced to the level of hydrogen peroxide alone, the overall bleaching is reduced by about 30% relative to the initial performance improvement over hydrogen peroxide alone. In the pH 10.5 example, the stain removal is reduced even more, nearly 50% relative, due to how high the pH is. In the example buffered at pH 4 there is essentially no drop in bleaching performance over 42 days of testing, indicating stability of the Bleach catalyst in this system. Surprisingly the Bleach catalyst is only stable in a liquid detergent if the detergent is moderately acidic, or below a concentrate pH of below 6.

Free of Anionic:

All previous examples described had been with nonionic surfactants only (24-7 and XP-50). The formulations described in Table 3 were tested here, using the method described at the beginning of the section, with linear alkyl benzene sulfonate, sodium lauryl ether sulfate, or lauric acid to determine if the Bleach catalyst would be stable in a composition with an anionic surfactant. All formulas were made using a moderately acidic concentrate pH (pH 4) and greater than 30% water (75%). The % stain removal recorded over a month of 120 F storage is displayed in Table 6.

TABLE 6

Percent stain removal from tea swatches of detergents, stored at 120 F., with a variety of anionic surfactants

| | % Soil Removal | | | | | |
|---|---|---|---|---|---|---|
| Day | Nonionic Only | 4% Linear Alkyl Benzene Sulfonate | 4% Sodium Lauryl Ether Sulfate | 2% Lauric Acid | Hydrogen Peroxide Only | Hydrogen Peroxide and Pegasus |
| 0 | 61.68 | 62.07 | 63.52 | 62.48 | 31.14 | 59.94 |
| 7 | 62.06 | 54.22 | 58.48 | 59.85 | | |
| 14 | 58.76 | 35.62 | 50.80 | 54.70 | | |
| 21 | | 24.48 | 46.25 | 52.60 | | |
| 28 | | | 38.02 | 43.90 | | |
| 42 | 58.65 | | | | | |

In all three examples above with anionic surfactant, the bleaching performance declines over the period of testing in high temperature storage. The example with LAS, the removal declined all the way down to the level of the hydrogen peroxide only control after only 21 days. The examples with SLES and lauric acid do not decline quite as much, but still declined by >50% relative to the initial improvement in stain removal over hydrogen peroxide alone. With nonionic surfactants only in the formulation, the % stain removal is essentially unchanged through the course of testing, indicating chemical stability of the Bleach catalyst in the detergent. Surprisingly, Bleach catalyst is stable in a liquid detergent which is a high aqueous system, moderately acid, and free of anionic surfactant.

The various embodiments being thus described, it will be apparent that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A liquid bleach catalyst detergent composition comprising:

A) a manganese bleach catalyst;

B) from about 20 wt. % to about 60 wt. % of an ethoxylated linear alcohol nonionic surfactant;

C) less than about 5 wt. % anionic surfactant;

D) a buffer; and

E) at least about 10 wt. % water; wherein said composition has a pH of less than about 6.

2. The bleach composition of claim 1 further comprising a catalyst according to the following formula:

$$[(L_pMn_q)_nX_r]Y_s$$

wherein each L independently is an organic ligand containing at least three nitrogen atoms and/or at least two carboxyl groups that coordinate with the Mn metal;

wherein each X independently is a coordinating or bridging group selected from the group of H2O, OH—, SH—, HO2—, O2—, O22—, S2—, F—, Cl—, Br—, I—, NO3—, NO2—, SO42-, SO32—, PO43—, N3—, CN—, NR3, NCS—, RCN, RS—, RCO2—, RO—, and

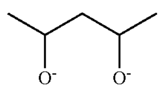

wherein R is a hydrogen or a C1 to C6 alkyl group;

wherein p is an integer from 1 to 4;

wherein q is an integer from 1 to 2;

wherein r is an integer from 0 to 6;

wherein Y is a counter ion; and wherein s is the number of counter ions.

3. The detergent composition according to claim 1, wherein a use solution of the detergent composition provides from about 0.01 ppm to about 5 ppm of the bleach catalyst.

4. The detergent composition according to claim 1, wherein the catalyst is a complex according to the following formula:

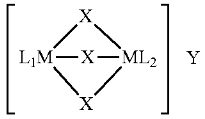

wherein M is Mn; wherein $L_1$ and $L_2$ are separate ligands or wherein $L_1$ and $L_2$ can combine to be a single molecule.

5. The detergent composition according to claim 1, further comprising an optical brightener.

6. The detergent composition according to claim 1, wherein buffer is acetic acid and/or sodium acetate trihydrate.

7. The detergent composition according to claim 1, further comprising a solvent of propylene glycol.

8. A liquid bleach catalyst laundry detergent use composition comprising a liquid bleach catalyst laundry detergent comprising:

A) from about 0.01 wt. % to about 15 wt. % of a manganese bleach catalyst;

B) from about 20 wt. % to about 60 wt. % of one or more ethoxylated linear alcohol nonionic surfactants;

C) less than about 5 wt. % anionic surfactant;

D) a buffer;

E) from about 0.1 wt. % to about 30 wt. % of at least one additional functional ingredient; and F) from about 30 wt. % to about 80 wt. % water; wherein said composition has a pH of less than about 6, and is diluted to form a use solution that both bleaches and cleans.

9. The method of claim 8 wherein said use solution includes a dilution ratio of between about 1:10 and about 1:1000 detergent to water.

10. The method of claim 8 wherein the use solution includes a dilution ratio of between about 1:100 and about 1:5000 detergent to water.

11. The composition of claim 8 wherein said catalyst is according to the following formula:

$$[(L_pMn_q)_nX_r]Y_s$$

wherein each L independently is an organic ligand containing at least three nitrogen atoms and/or at least two carboxyl groups that coordinate with the Mn metal;

wherein each X independently is a coordinating or bridging group selected from the group consisting of H2O, OH—, SH—, HO2—, O2—, O22—, S2—, F—, Cl—, Br—, I—, NO3—, NO2—, SO42—, SO32—, PO43—, N3—, CN—, NR3, NCS—, RCN, RS—, RCO2—, RO—, and

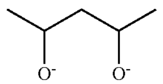

wherein R is a hydrogen or a C1 to C6 alkyl group;

wherein p is an integer from 1 to 4;

wherein q is an integer from 1 to 2;

wherein r is an integer from 0 to 6;

wherein Y is a counter ion; and wherein s is the number of counter ions.

12. The detergent composition according to claim 8, wherein the composition has a pH of at least about 4.5.

13. The detergent composition according to claim 8, wherein the buffer is acetic acid.

14. The detergent composition according to claim 1, wherein the catalyst is a complex according to the following formula:

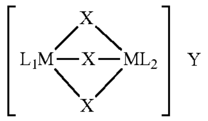

wherein M is Mn; wherein $L_1$ and $L_2$ are separate ligands or wherein $L_1$ and $L_2$ can combine to be a single molecule.

15. A method of cleaning and/or bleaching textiles comprising:

providing the liquid bleach catalyst detergent composition of claim 1;

generating a use solution from the detergent composition in a laundry machine; and contacting a textile in need of cleaning and/or bleaching with the use solution.

16. The method of claim 15 wherein said laundry machine is a consumer use machine.

17. The method of claim 15 wherein said laundry machine is an industrial or institutional use machine.

18. The method of claim 15 wherein said laundry machine is a continuous washer, batch washer extractor, textile-presoak wash system, steam system, dry-wash device, other dry-cleaning device, or top or side loading washing machine.

19. The method of claim 15 wherein said laundry machine is a single washing machine or continuous load washer, or a combination thereof.

20. The method of claim 15 wherein said textile is a woven or non-woven fabric or article, or garment.

21. The method of claim 20 wherein said textile is one or more of a cotton, poly-cotton blends, wool, aramids, polyurethanes, olefins, polyactids, nylons, silk, hemp, rayon, flax, jute, acrylics, polyesters, those made from many other synthetic or natural fibers and mixtures thereof.

22. The method of claim 15 wherein said use solution includes a dilution ratio of between about 1:10 and about 1:1000 detergent to water.

23. The method of claim 15 wherein the concentrate is diluted at a ratio of between about 1:100 and about 1:5000 detergent to water.

24. The method of claim 15 wherein said bleaching and cleaning are performed in a single step in said use solution.

* * * * *